Figure 1:
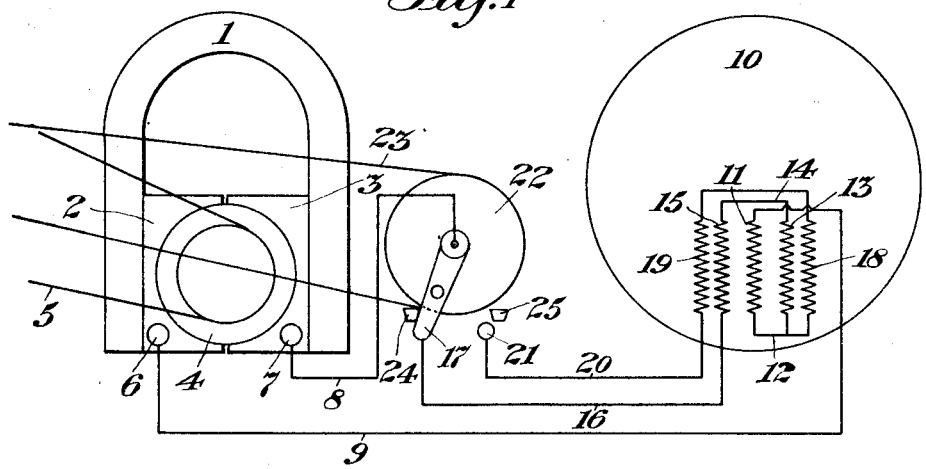

M. R. HUTCHISON.
SPEED CONTROLLED DEVICE AND INDICATOR.
APPLICATION FILED AUG. 24, 1908.

1,068,132.

Patented July 22, 1913.

WITNESSES:
Chas. F. Clagett
Irving McKnight

INVENTOR.
Miller Reese Hutchison
BY
George C. Allan ATTORNEY.

UNITED STATES PATENT OFFICE.

MILLER REESE HUTCHISON, OF SUMMIT, NEW JERSEY, ASSIGNOR TO THE INDUSTRIAL INSTRUMENT COMPANY, OF WATERBURY, CONNECTICUT, A CORPORATION OF CONNECTICUT.

SPEED-CONTROLLED DEVICE AND INDICAT*

1,068,132. Specification of Letters Patent. Patented July 22, 1913.

Application filed August 24, 1908. Serial No. 450,059.

*To all whom it may concern:*

Be it known that I, MILLER REESE HUTCHISON, a citizen of the United States, and a resident of Summit, in the county of Union and State of New Jersey, have invented certain new and useful Improvements in Speed-Controlled Devices and Indicators, of which the following is a specification.

My present invention includes means whereby a shaft or other moving body or surface is utilized to cause movement of an indicator or similar device, in such manner that a given velocity of movement of the shaft or other driving member will produce given movement of the driven member, the relation being preferably such that the amount of movement of the latter corresponds to the velocity of movement of the former. The driven member may be utilized to give an indication in any desired manner, or, for example, by movement of an index over a calibrated scale. The device may be calibrated for revolutions per minute, or peripheral velocities, or lineal velocities of moving surfaces, or the speed of travel of a vehicle or boat.

In the form shown in the drawings, the device is adapted for use as a speed indicator, the scale being calibrated in miles per hour or revolutions per minute. The driving member is indicated as being the propeller shaft of a ship. It is obvious, however, that the device may be applied to any shaft, and where such shaft is one which is either a driving shaft or a driven shaft whose rate of revolution is proportional to the speed of the craft or vehicle, the scale may be calibrated to show the corresponding speed of the craft or vehicle.

According to my invention, the indicator or its equivalent is actuated by a displacement or pressure produced by revolution of the propeller shaft, which displacement or pressure corresponds to the velocity or rate of revolution of said shaft. The displacement or pressure which I contemplate utilizing is the electrical pressure of a suitably designed electrical generator driven from or controlled by the propeller shaft, so that its rate of revolution is proportional thereto. For this purpose, the generator is designed in accordance with principles well known in the art, so that the electrical pressures or voltages generated thereby, are directly proportional to the rate of revolution, throughout a considerable range. The ratio of revolution of the generator shaft to the revolutions of propeller shaft is made such that the limits of speeds to be measured will correspond to those speeds of the generator for which the voltages are proportional to the revolution per minute of the generator shaft.

In order to be practically useful, it is necessary that the voltage generated in the armature winding should be proportional to the speed, and also that such voltage should be applied to actuate the indicator through connections which are not subject to periodic or accidental variations. In order to get the proportional voltages, I prefer to use a generator having a permanent magnetic field, though an electromagnetic field may be employed where means are available for insuring constant intensity of magnetization. In order that the voltages may be applied to the indicator unmodified by internal variables, I prefer that the generator be of the induction type. In practice, I find that where a direct current generator is used, the brushes form a variable contact with the commutator. The pressure varies, especially at high speeds, and the contacting surfaces oxidize and change their resistance, thereby introducing considerable errors. On the other hand, a magneto-induction generator may be made with a stationary armature solidly and permanently connected so that the entire circuit from the armature to the indicator is without moving contacts such as are likely to cause objectionable variations of resistance and transmitted voltage.

The fluctuating or alternating voltages proportional to the speed, obtained from the induction generator, are utilized to actuate any desired instrument capable of responding to voltage or current, as, for instance, an alternating current voltmeter. The speed indications may be shown either by one scale indicating means, such, for example, as a single zero limit scale, or by two scale indicating means, such as a central zero double scale, or two single zero limit scales arranged for reverse indications.

When the indicator is to be used on a shaft where practical use requires reversing, the alternating current voltmeter will give indications corresponding to the rate of revolution of the shaft, without indicating the direction of revolution. In certain instances, notably on shipboard, it is essential that when any indication of shaft rotation is given, the same indication which gives its rate shall also be an indication of its direction. For example, the captain or pilot of a vessel equipped with an indicating device adapted to denote rotation of the propeller shaft for movement of the vessel must be assured absolutely that absence of forward indication denotes the absence of forward rotation, and that any forward indication given must be the result of forward rotation. Furthermore, in order that possibility of confusion or mistake may be avoided, it is desirable that absence or presence of rotation in a given direction may be ascertained by observation of a single indicating device, such as one comprising a single index, pointer, or other movable member. For the attainment of such objects I provide indicating means and controlling connections therefor from the shaft, such that the direction of shaft rotation as well as the speed of shaft rotation is infallibly shown; and this regardless of the direction of movement of the ship, in event the apparatus is used on shipboard. Where it is desired that rotation in both directions be indicated, I may use a single meter connected so that the relation of flow of current through its field coils and its movable coil, will be reversed when the propeller shaft is reversed. This reversal of field with respect to the coil of the meter may be effected by a switch, such as above described.

By utilizing an electrical pressure or voltage to produce an indication, I am enabled to have as many indicating stations as desired. If desired, a circuit may be extended to fifteen or twenty stations, and indicating instruments for each station may be arranged in parallel circuits or branches. If by reason of the number or character of the instruments, the voltage of the generator is modified at the instrument, each instrument of the equipment may be calibrated after installation, in accordance with observed rates of speed or work.

The above described principles of my invention and the manner in which they may be embodied in speed indicators, will be more fully understood from a detailed description thereof in connection with the accompanying drawings, in which—

Figure 2:
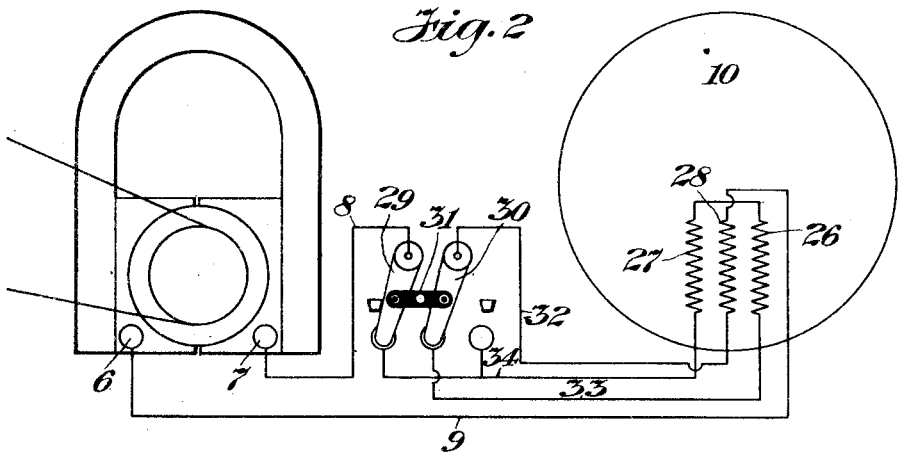

Figures 1, and 2, are diagrammatic views showing two ways in which my invention may be practised.

In Fig. 1 the apparatus comprises the alternating current generator, means for driving it from the shaft, the speed of which is to be measured, an electrical indicating device adapted to respond to changes of voltage in the generator, and a reversing device or switch for reversing the direction of response of the indicator when the driving shaft is reversed.

The constant magnetic field of the generator is indicated by the permanent magnet 1, having pole pieces 2, 3, arranged closely adjacent an inductor 4, consisting essentially of two segmental magnetic screens and driven in any suitable manner, as by chain 5 connected directly or indirectly to the shaft whose movements are to be indicated. The rotation of the inductor 4 distorts the magnetic field, displacing the lines of force, and causing them to cut the winding of stationary coils 4ª, thereby generating alternating voltages therein. These coils, constituting a stationary armature, are connected through good electrical contacts at 6, 7, with the circuit leads 8, 9. The rate of and extent of displacement of magnetic lines and the corresponding voltages of the alternating current impressed upon 8 and 9, are proportional to the speed of rotation of the inductor 4 throughout a considerable range of speed, and it is within this range of proportional variation that the apparatus is used to produce its indications. To this end, the ratio of the gearing of 5 from the main shaft to the inductor is such that the lowest useful speed of the drive shaft will cause a rotation of the inductor at a speed sufficiently high to be above the lower limit of this range of proportional voltage change.

The alternating voltages are applied to any alternating current translating device adapted to produce effects proportional to the applied voltage, as, for instance, a voltmeter. The effect, as, for instance, the extent of movement of the index of the voltmeter may be calibrated so as to give direct readings of the revolutions per minute of the driving shaft or direct reading of any movements of any driving or driven part whose movements are a function of or are proportional to such revolutions per minute.

In the drawings, the electrical relations which may be utilized to produce the indications are diagramatically shown at 10, the index and scale being removed in order to show said relations more clearly. The voltages and currents impressed through connection 6 and circuit lead 9 traverse coil 11, thence through conductor 12; coil 13, conductor 14, coil 15, conductor 16, switch 17, and then through return 8 to armature connection at 7. The coils 13, 15, are preferably utilized as stationary field coils, whereas the coil 11 is acted on inductively by said field coils, and its movements are utilized in any known or desired way to produce the desired effect or indication. It will be noted that whatever movement, either of attraction or repulsion, is imparted to coil 11 by the inductive effect of the current in 13 and 15 by currents in one direction, will also be produced by currents in the reverse direction, because said coils are serially connected, and reversal of current in one necessarily involves reversal of current in the other, so that the relative directions of the current are unchanged.

It will be noted that the movement of 11 in response to any current, being always in the same direction with respect to coils 13, 15, regardless of the polarity of the current, will fail to indicate a reversal of the propeller shaft, though such reversal would operate to reverse the inductor 4. The observer would see that the propeller has stopped and started, but would not know the direction of either movement. This is unimportant in some cases, but for remote stations on shipboard, it may be of great importance to know the direction of rotation as well as the speed. Moreover, in the case of an indicator calibrated for the speed of a ship, the speed ahead for a given rate of revolution per minute of the propeller shaft will be quite different from the speed astern for the same rate of revolution of the shaft when reversed. By using a separate indicator or causing the same indicator to travel over a different portion of the scale for forward and reverse movement, the one scale may be calibrated for forward speeds and the other scale for speeds astern. The required movement of the coil 11 in the opposite direction upon reversal of the propeller shaft, may be effected by any electrical expedient adapted to reverse the electrical relations of said coil with respect to its field. In the arrangement shown in Fig. 1, I provide duplicate or alternative field coils 18, 19, reversely connected or wound with respect to 13 and 15, and arrange an automatic switch for substituting said second set of coils when the driving shaft is reversed, so that current from terminal 6, through lead 9, traverses coil 11, as before, but instead of returning through coils 13 and 15, it traverses reversely wound or connected coils 18, 19, and return wire 20 to switch contact 21, then through switch 17 and return wire 8 to terminal 7. The switch may be automatically thrown in any desired way. A simple arrangement is that shown in Fig. 1, where said switch is operated by a pulley 22, geared or belted, as at 23, so as to reverse its direction of rotation when the propeller shaft or other driving shaft reverses. Rotation of the pulley 22 in one direction, say to the left, carries the switch arm 17 toward the left, until it brings up against stop 24. Some form of slip connection then permits 17 to remain stationary, so long as the main shaft rotates in this direction. The belt 23 may slip, or, if desired, either pulley 22 or switch arm 17 may be frictionally mounted so that the slip may be at either of these points. When the propeller shaft reverses, pulley 22 is driven in the opposite direction, and the switch arm is carried therewith until it brings up against stop 25, thus throwing in the second set of field coils 18, 19.

In Fig. 2 I have shown an apparatus which may be in all respects the same as that shown in Fig. 1, except that instead of providing two sets of field coils connected in series with the indicator coil, I connect the field coils 26, 27, in series with each other and with the indicator coil 28, so that current always flows in the same relation through the indicator coil, but may be relatively reversed through the field coils. Reversal is effected by throwing the double pole switch comprising conducting arms 29, 30, held in parallel relation by the non-conducting link 31. This switch is thrown in accordance with the movement of the propeller shaft by means not shown, but which may be the same as that shown in Fig. 1. When said switch is in the position shown in Fig. 2, the voltage and current is applied from terminal 6, through lead 9, coil 28, conductor 32, switch arm 30, conductor 33, coil 26, coil 27, and back through 34, switch arm 29 and return 8 to terminal 7. When the switch is thrown in the other direction, the current takes the path 6, 9, 28, 32, 30, the same as before, but from this point it passes through 34, 27, 26, and 33 in the opposite direction to that first described, thus reversing the inductive effect and causing the indicator coil 28 to be deflected in the opposite direction from that first mentioned. The return through 29, 8, and 7 is as before.

With either of these arrangements, an indicator carried by coil 28 will be deflected in one direction for speeds in one direction and in the reverse direction for reverse speeds, and the corresponding portions of the scale may be calibrated either for revolution per minute or for speeds of the craft ahead and astern respectively.

As I have explained above, I prefer to use a generator in which the variations of voltage are substantially proportional to the speed for all speeds at which it is to be used, and also indicating devices which do not vary the distribution of equal voltages to the several instruments, but these are not necessary in all cases, since where the scale is to indicate rates of work or speed, the equipment and apparatus to which it is applied, may be experimentally tested out after installation, and the calibration then made in accordance with the accurately measured rates of work or speed which are found in practice to correspond to different positions of the index.

While I have herein fully shown and described, and have pointed out in the appended claims certain novel features of construction, arrangement, and operation which characterize my invention, it will be understood by those skilled in the art that various omissions, substitutions, and changes in the forms, proportions, sizes, and details of the device and of its operation, may be made without departing from the spirit of my invention.

I claim:

In a rate indicator for shafts subject to variations of speed, an induction magneto generator adapted to generate fluctuating voltages varying in definite relation to variations in the speed of the generator shaft, a volt meter arranged for deflections and readings in both directions, in combination with a switch arranged to connect the volt meter for deflection in either of said directions, and means for throwing said switch upon reversal of said generator.

Signed at New York city, in the county of New York and State of New York, this 22nd day of August A. D. 1908.

MILLER REESE HUTCHISON.

Witnesses:
JONATHAN HARALSON,
IRVING M. OBRIEGHT.